United States Patent
Paponneau et al.

(10) Patent No.: US 10,063,187 B2
(45) Date of Patent: Aug. 28, 2018

(54) METHOD FOR ASSESSING PARAMETERS FOR CONTROLLING A SOLAR TRACKER

(71) Applicant: Exosun, Martillac (FR)

(72) Inventors: Francois Paponneau, Cestas (FR); Adrien Lucas, Bordeaux (FR)

(73) Assignee: EXOSUN, Martillac (FR)

( * ) Notice: Subject to any disclaimer, the term of this patent is extended or adjusted under 35 U.S.C. 154(b) by 243 days.

(21) Appl. No.: 15/106,518

(22) PCT Filed: Dec. 17, 2014

(86) PCT No.: PCT/FR2014/053381
§ 371 (c)(1),
(2) Date: Jun. 20, 2016

(87) PCT Pub. No.: WO2015/092268
PCT Pub. Date: Jun. 25, 2015

(65) Prior Publication Data
US 2016/0336900 A1 Nov. 17, 2016

(30) Foreign Application Priority Data
Dec. 19, 2013 (FR) ...................................... 13 63097

(51) Int. Cl.
*G01C 21/02* (2006.01)
*H02S 50/15* (2014.01)
(Continued)

(52) U.S. Cl.
CPC ................ *H02S 50/15* (2014.12); *F24J 2/38* (2013.01); *G01S 3/7861* (2013.01); *F24J 2/541* (2013.01);
(Continued)

(58) Field of Classification Search
CPC ....... F24J 2002/0084; F24J 2/38; Y02E 10/47
See application file for complete search history.

(56) References Cited

U.S. PATENT DOCUMENTS

2011/0315197 A1* 12/2011 Angoli ................. F24J 2/5241
136/246
2013/0048048 A1  2/2013 Flanery
2015/0100281 A1  4/2015 Fink

FOREIGN PATENT DOCUMENTS

EP  2 597 397   5/2013
EP  2 660 739   11/2013
(Continued)

OTHER PUBLICATIONS

International Search Report dated Mar. 6, 2015 out of corresponding priority Application No. PCT/FR2014/053381 (9 pages).
(Continued)

*Primary Examiner* — Thanh Luu
(74) *Attorney, Agent, or Firm* — Brinks Gilson & Lione; John C. Freeman (57) ABSTRACT

The invention relates to a method for assessing parameters for controlling a solar tracker including modules which include a table of means for processing solar radiation which is movable on means for connecting to the ground, which includes detecting, for each connection means, spatial coordinates of a point for connection with the table; for each module: i. determining a tilt of the table from the determined spatial coordinates; ii. determining spatial coordinates of a series of reference points of the table from the spatial coordinates and the tilt; determining, for each module, positioning parameters of the table relative to directly adjacent tables, from the spatial coordinates of the reference points; and determining parameters for controlling the tracker from the tilt and the relative positioning parameters of the tables of the tracker.

10 Claims, 6 Drawing Sheets

(51) Int. Cl.
F24J 2/38 (2014.01)
G01S 3/786 (2006.01)
F24J 2/54 (2006.01)
F24J 2/00 (2014.01)

(52) U.S. Cl.
CPC ...... F24J 2/5417 (2013.01); F24J 2002/0084 (2013.01); F24J 2200/04 (2013.01); Y02B 10/20 (2013.01); Y02E 10/47 (2013.01)

(56) References Cited

FOREIGN PATENT DOCUMENTS

| FR | 1255956 | 3/1961 |
|----|---------|--------|
| JP | 2011 108855 | 6/2011 |

OTHER PUBLICATIONS

Written Opinion dated Mar. 6, 2015 out of corresponding priority Application No. PCT/FR2014/053381 (5 pages).
Abstract, Panico, "Backtracking: a novel strategy for tracking PV systems", Proceedings of the Photovoltaic Specialists Conference, Las Vegas, Oct. 7-11, 1991, IEEE, US, vol. Conf. 22, pp. 668-673, NPL Reference No. XP010039298, ISBN 0-87942-636-5 http://ieeexplore.ieee.org/xpl/articleDetails.jsp?arnumber=169294.
Abstract, Lorenzo, "Considerations in the design of a one-axis tracking photovoltaic system", Progress in Photovoltaics: Research and Applications, vol. 2, No. 1, Jan. 1, 1994, pp. 45-55, NPL Reference No. XP055025119 http://onlinelibrary.wiley.com/doi/10.1002/pip.4670020107/abstract.
Abstract, Navarte, "Tracking and Ground Cover Ratio", Progress in Photovoltaics: Research and Applications, vol. 16, No. 8, Dec. 1, 2008, pp. 703-714, NPL Reference No. XP055025095, ISSN 1062-7995 http://onlinelibrary.wiley.com/doi/10.1002/pip.847/abstract.
Abstract, Kim et al., "Optimal Spacing of Dual-axis Trackers for Concentrating Photovoltaic Systems", AIP Conference Proceedings, 20110101 AIP-ISSN 0094-243X, vol. 1407, Jan. 1, 2011, pp. 370-373, NPL Reference No. XP055040946, http://scitation.aip.org/content/aip/proceeding/aipcp/10.1063/1.3658364.
Abstract, Lorenzo et al., "Tracking and back-tracking", Progress in Photovoltaics: Research and Applications, vol. 19, No. 6, Feb. 23, 2011, pp. 747-753, NPL Ref. No. XP055025105, ISSN: 1062-7995 http://onlinelibrary.wiley.com/doi/10.1002/pip.1085/abstract.
Abstract, Kim et al., "Modeling of a concentrating photovoltaic system for optimum land use, Progress in Photovoltaics: Research and Applications", Oct. 1, 2011, pp. n/a-na/, NPL Ref. No. XP055040944, ISSN:1062-7995 http://onlinelibrary.wiley.com/doi/10.1002/pip.1176/abstract.

* cited by examiner

METHOD FOR ASSESSING PARAMETERS FOR CONTROLLING A SOLAR TRACKER

This application claims priority to International Application No. PCT/FR2014/053381 filed Dec. 17, 2014 and to French Application No. 1363097 filed Dec. 19, 2013; the entire contents of each are incorporated herein by reference.

The invention concerns a method of evaluating control parameters of a solar tracker.

A solar power station consists of a series of solar trackers, each solar tracker of the series consisting of a set of solar modules. Each solar module includes solar radiation processing means. During the study prior to installation of the solar power station, the layout of the various solar modules and therefore the various solar trackers forming the solar power station is determined in order to minimise the relative slopes of the various solar modules so as to approximate as closely as possible a theoretical ideal layout. A layout specification is therefore established beforehand. It is to be noted that, whatever the direction, the relative slopes of the various solar modules can increase the risks of shading between two adjacent solar modules and therefore the phases of correcting the tracking of the daily passage of the Sun during the day. A direct consequence of this is to reduce the production output of the solar power station and thus to reduce the energy performance of the power station.

At present, in order to optimise the energy performance of the power station by aiming to minimise the losses caused by disparities of the terrain on which the solar modules constituting the solar power station are installed, a set of global control parameters is predefined for the whole of the solar power station. However, a set of global control parameters of this kind does not enable optimum control of the solar power station because a set of global parameters of this kind applied to all the solar modules of the solar power station takes into account only the relative positioning of two adjacent solar modules producing the worst risk of shading. Controlling the solar power station in this way does not make it possible to optimise as much as possible the energy performance of the solar power station.

An object of the invention is to provide a method of evaluating control parameters that makes it possible to optimise further the energy performance of a solar power station by minimising the losses caused by the disparities of the terrain on which the various solar modules of the solar power station are installed.

To this end, there is provided, in accordance with the invention, a method of evaluating control parameters of a series of solar trackers of a solar power station, each solar tracker of the series of solar trackers including a set of solar modules, each solar module including a table of solar radiation processing means mounted to be rotatable about a rotation axis to track a diurnal passage of the Sun on means of connection to the ground, the method including steps of:

a—for each of the ground connection means, determining coordinates in space of a point of connection with the table;

b—for each of the solar modules:
 i. determining an inclination of the associated table from the coordinates in space so determined of the ground connection means of the associated table;
 ii. determining the coordinates of a series of reference points of the associated table from the coordinates in space of the ground connection means of the associated table and the inclination of the associated table;

c—for each of the solar modules, determining a set of relative positioning parameters of the associated table with tables directly adjacent the associated table of the solar power station from the coordinates in space of the series of reference points of the tables concerned;

d—for each solar tracker of the series of solar trackers, determining the control parameters of the solar tracker concerned from the inclination and the set of relative positioning parameters of the tables of the set of solar modules of the solar tracker concerned.

Determining the coordinates in space of a point of connection with the table for each of the ground connection means therefore makes it possible to determine the real positions of the various tables of the solar power station and to calculate control parameters specific to each of the solar trackers that form the solar power station. Consequently, each solar tracker of the series of solar trackers is controlled independently, which makes it possible to optimise as much as possible the energy performance of the solar power station by minimising the energy losses associated with the risks of shading caused by the disparities of the terrain on which the solar power station is installed.

The method in accordance with the invention advantageously has at least one of the following optional additional technical features:

the inclination is evaluated relative to a horizontal;

the series of reference points includes a point on a North edge of the table, a central point of the table and a point on a South edge of the table;

the three points are aligned along a North-South axis;

during the step c, the directly adjacent tables concerned are those for which there is a risk of shading the associated table during the daily passage of the Sun;

the set of relative positioning parameters includes height difference values between the North and South edges of the associated table and the facing edges of the directly adjacent tables;

the control parameters of the solar tracker concerned include maximum values of the distributed height difference values by relative positioning of the associated table and the directly adjacent table concerned;

the control parameters of the solar tracker concerned include minimum values of the distributed distance values by relative positioning of the associated table and the directly adjacent table concerned; and the control parameters of the solar tracker concerned include an average value of the inclinations of the tables of all the solar modules of the solar tracker concerned.

Other features and advantages of the invention will become apparent in the course of the following description of the method in accordance with one embodiment of the invention. In the appended drawings.

A method in accordance with the invention of evaluating control parameters will be described with reference to the various FIGS. 1 to 15. This description concerns a solar power station including a set of so-called "single-axis" solar modules each including a table formed of solar radiation processing means. Each of the tables is mounted to be rotatable about a substantially horizontal axis on a set of three piles substantially aligned in a North-South direction. Such modules are described in more detail in the document FR 12 55 956, which may be referred to for more information. However, the control method in accordance with the invention that is to be described may be applied to other types of solar modules forming a solar power station. In particular, the method in accordance with the invention of evaluating control parameters may be applied to so-called "two-axis" solar modules and to solar trackers including one or more solar modules controlled by the same control parameters.

Figure 1:
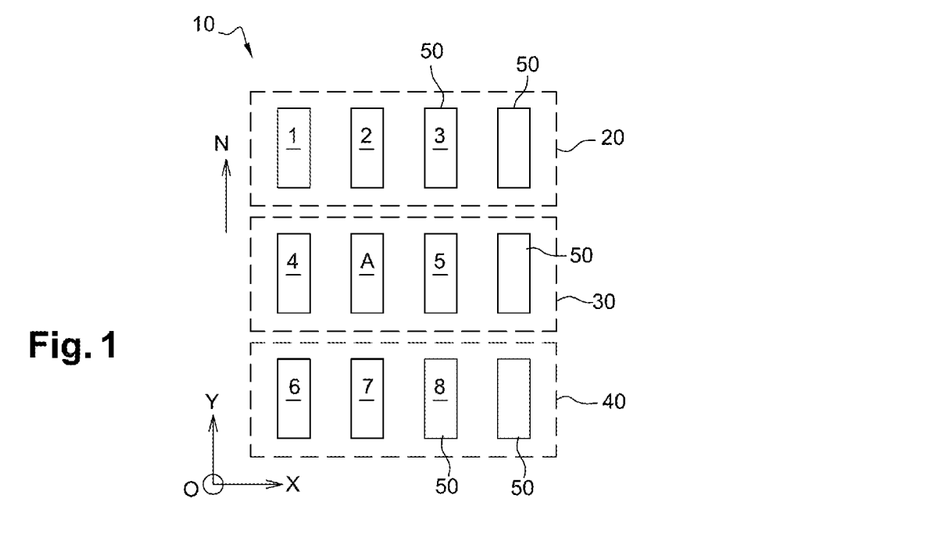
FIG. 1 is a diagrammatic plan view of the layout of a solar power station.
Figure 2:
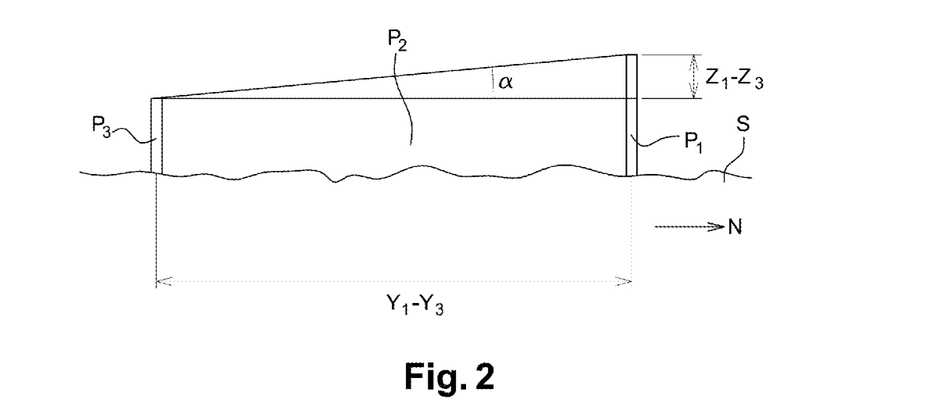
FIG. 2 is a diagrammatic view illustrating the determination of the inclination in the method in accordance with the invention.

In FIG. 1, a solar power station 10 here includes three solar trackers 20, 30, 40. Each of the solar trackers 20, 30, 40 includes a set of solar modules 50, here four in number. Each of the solar modules 50 includes a table 1, 2, 3, 4, 5, 6, 7, 8, A formed of solar radiation processing means. These tables are of rectangular shape and oriented in a North-South direction. Each of the tables is mounted to be mobile in rotation about a rotation axis on ground connection means P1, P2, P3, which here are piles driven into the ground S on which the solar power station 10 is installed. Such ground connection means are shown in FIG. 2, for example.

Figure 15:
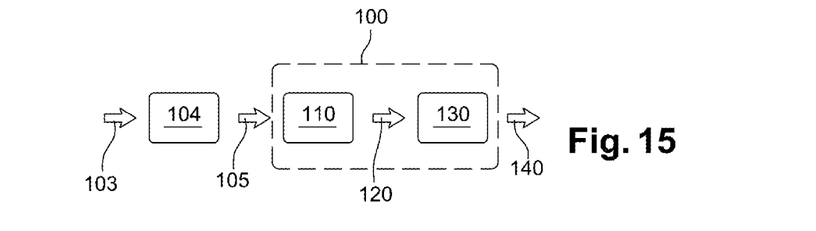
FIG. 15 is a flowchart illustrating one process for laying out a solar power station, the process including the method in accordance with the invention.

Referring to FIG. 15, a theoretical layout of the solar power station 10 is produced first during a study 103 that makes it possible to establish a layout specification 104. This layout specification 104 is applied to the terrain on which the solar power station 10 is installed during work on a site 105 during which all of the ground connection means P1, P2, P3 are installed on the ground S on which the solar power station 50 is installed.

It is to be noted that the disparities of the ground S shown in FIGS. 2, 3a, 3b and 7 to 12 are deliberately exaggerated with the exclusive aim of illustrating the following description.

Once the works on the site 105 have been completed, or during these works, a first step 110 of the method 100 in accordance with the invention of evaluating the control parameters is carried out. This step 110 consists in determining the coordinates in space of a point of connection with the table for each of the ground connection means P1, P2, P3, which table is thereafter mounted to be rotatable about an axis on these connecting means. In the case of the "single-axis" solar modules shown here, this refers to the tops of the free ends of the piles P1, P2, P3. These coordinates in space are in an orthonormal terrestrial frame of reference (O, X, Y, Z). By calculation if necessary, this frame of reference is generally a frame of reference centred to the South-West of the solar power station 10 the axis Y of which is in the lengthwise direction of the tables 1, 2, 3, 4, 5, 6, 7, 8, A and the axis Z of which is colinear with a normal of the natural terrain represented by the ground S. The type of calculation to be effected depends on the report of the geometer and their hypotheses concerning the site for installing the solar power station 10.

All of these coordinates in space of a point of connection with the table form a verification specification 120. In a global step 130 the method 100 in accordance with the invention of evaluating the control parameters determines from this verification specification 120 a set of control parameters 140 associated with each of the solar trackers 20, 30, 40 forming the solar power station 50.

The various control parameters 140 determined by the method 100 in accordance with the invention of evaluating the control parameters will now be described in detail with reference to FIGS. 2 to 13.

The method in accordance with the invention of evaluating the control parameters firstly includes a preliminary calculation step. This step makes it possible to characterise each table 1, 2, 3, 4, 5, 6, 7, 8, A that is part of the solar power station 10 and therefore of the various solar trackers 20, 30, 40. Each table A is then completely located in space. Thanks to the coordinates (X, Y, Z) in space of the connection points with the table A of the piles P1, P2, P3 in the verification specification, a simple calculation makes it possible to locate the North and South edges of the tables and determine their inclination. This calculation depends on the dimensions of the tables, which are known beforehand.

In the context of illustrating the method 100 in accordance with the invention of evaluating the control parameters, the inclination of the table A is defined as being the angle α between a straight line passing through the apex forming a point of connection with the table A of the end piles P1, P3 and a horizontal passing through those same piles, as shown in FIG. 2. The respective tops of the piles P1 and P3 have respective coordinates in space $(X_1, Y_1, Z_1)$ and $(X_3, Y_3, Z_3)$.

The inclination α of each table A is then determined with the aid of the altitude $Z_1, Z_3$ of the tops of the piles P1, P3 and a distance $Y_1$-$Y_3$ between these two end piles P1, P3. The inclination α is considered positive when the table A is oriented toward the South as in FIG. 2; only the end piles (P1 and P3) are taken into account in the calculation. The equation is:

$$\alpha = \text{Atan}\left(\frac{Z_1 - Z_3}{Y_1 - Y_3}\right) \tag{1}$$

Figure 3A:
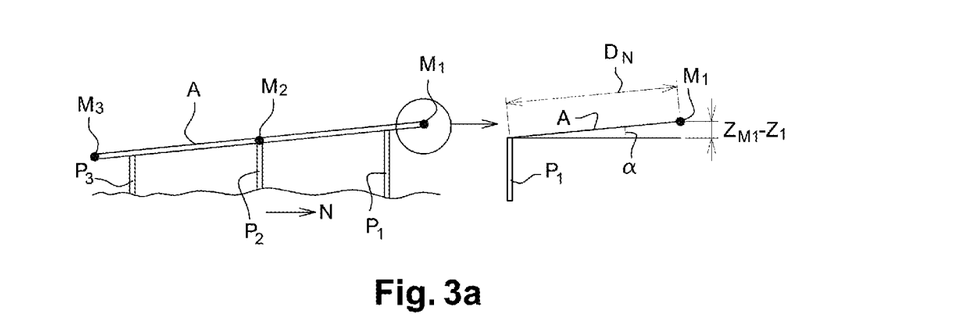
FIGS. 3A and 3B and 4 are diagrammatic views illustrating the determination of a series of reference points in accordance with the method in accordance with the invention.
Figure 3B:
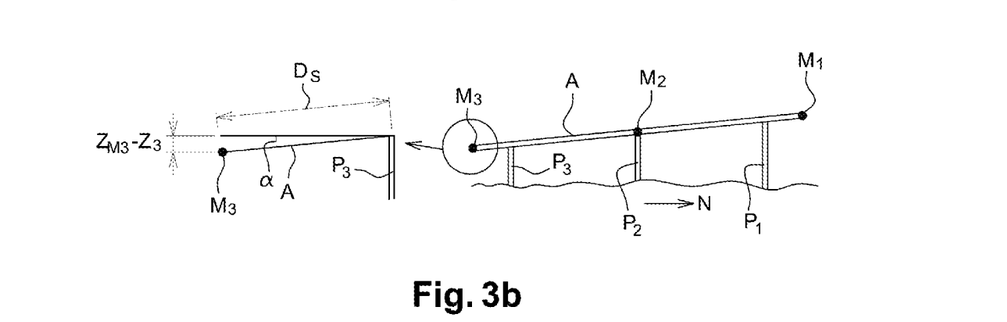
Figure 4:
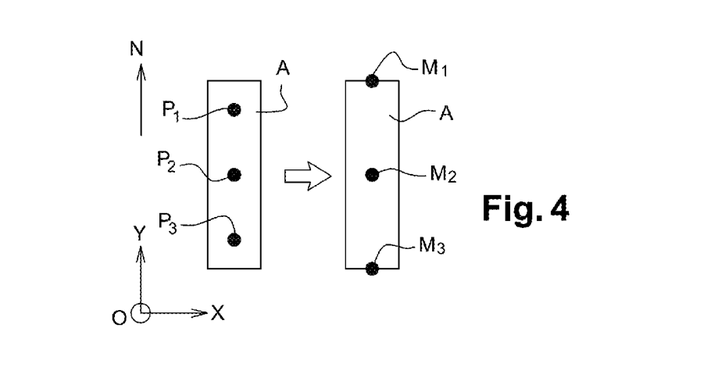

The inclination α being known, reference points M1, M2, M3 for each of the tables A are calculated, knowing a North overhang $D_N$ and a South overhang $D_S$ of the table A. The point M1 is therefore situated on a North edge of the table A concerned and the point M3 is therefore situated on a South edge of the table A concerned, while the point M2 corresponds to the point of connection with the table A concerned of the connecting means P2, i.e. here the top of the free end of the pile P2. FIGS. 3a and 3b illustrate this situation. The equations that make it possible to change from the coordinates in space of the points of connection with the table A of the ground connection means P1, P2, P3 to the coordinates in space of the reference points M1, M2, M3 associated with the table A concerned, shown in FIG. 4, are:

$$X_{M1} = X_{M2} = X_{M3} = X_2 \tag{2}$$

$$Y_{M1} = Y_1 + \cos(\alpha) \cdot D_N \tag{3}$$

$$Y_{M2} = Y_2 \tag{4}$$

$$Y_{M3} = Y_3 - \cos(\alpha) \cdot D_S \tag{5}$$

$$Z_{M1}=Z_1+\sin(\alpha)\cdot D_N \quad (6)$$

$$Z_{M2}=Z_2 \quad (7)$$

$$Z_{M3}=Z_3-\sin(\alpha)\cdot D_S \quad (8)$$

The reference points M1, M2, M3 are therefore aligned on a North-South axis.

When erecting a table A, the middle pile P2 serves as a reference for the North/South positioning. In practice, alignment defects of the piles P1, P2, P3 are corrected by axis supports of the piles P1 and P3, as described in the document FR 12 55956. The abscissa X of the reference points M1, M2, M3 is therefore considered as identical and equal to that of the pile P2 (Equation 2).

At the end of this preliminary calculation step, each table A of all the solar modules 50 forming the solar power station 10 is associated with a series of reference points M1, M2, M3 (here three in number).

It now is necessary to locate the tables A relative to one another, i.e. to measure for each table A the coordinates of the reference points of the adjacent tables 1, 2, 3, 4, 5, 6, 7, 8. Starting from there, the method 100 in accordance with the invention of evaluating the control parameters will determine for each table A of all the solar modules 50 a set of relative positioning parameters of the table A concerned relative to the tables 1, 2, 3, 4, 5, 6, 7, 8 directly adjacent said table A concerned.

Those various relative positioning parameters are summarised in the following table:

| Parameter | Tables concerned |
|---|---|
| ΔzL-OE | A-5 |
| ΔzL-EO | A-4 |
| ΔzOEDS | A-3 |
| ΔzEODS | A-1 |
| ΔzOEDN | A-8 |
| ΔzEODN | A-6 |
| DEW | A-5 |
| DNSN | 2-A |
| DNSS | A-7 |

The first six relative positioning parameters from the table correspond to height differences Δz between the table A concerned and the directly adjacent tables 1, 3, 4, 5, 6 and 8 respectively situated to the North-West, the North-East, the East, the West, the South-West and the South-East. The last three relative positioning parameters from the table correspond to distances between the table A concerned and the directly adjacent tables 2, 5 and 7 respectively situated to the North, the East and the South.

Moreover, the layout specification 104 makes it possible to determine three theoretical relative positioning parameters as follows:
  Dew$_{th}$: Theoretical distance between a table and its neighbour to the East or West,
  Dnsn$_{th}$: Theoretical distance between a table and its neighbour to the North,
  Dnss$_{th}$: Theoretical distance between a table and its neighbour to the South.

It is to be noted that these theoretical relative positioning parameters correspond to the last three positioning parameters from the foregoing table.

The calculation for each table A of the associated set of relative positioning parameters using the method 100 in accordance with the invention of evaluating the control parameters will now be described with reference to FIGS. 5 to 13.

The parameter ΔzL-OE (FIG. 5) reflects a height difference between two tables laid out West-East in the same row; it is taken into account in a control strategy for the solar power station 10 when the Sun is to the West and there is a risk of the table A shading the table 5 to its East. This parameter ΔzL-OE is calculated as a function of the table edge heights. For each of the three reference points M1, M2, M3 of the table A, the reference points M51, M52, M53 of the table 5 to its East are determined in order thereafter to subtract their height.

Figure 5:
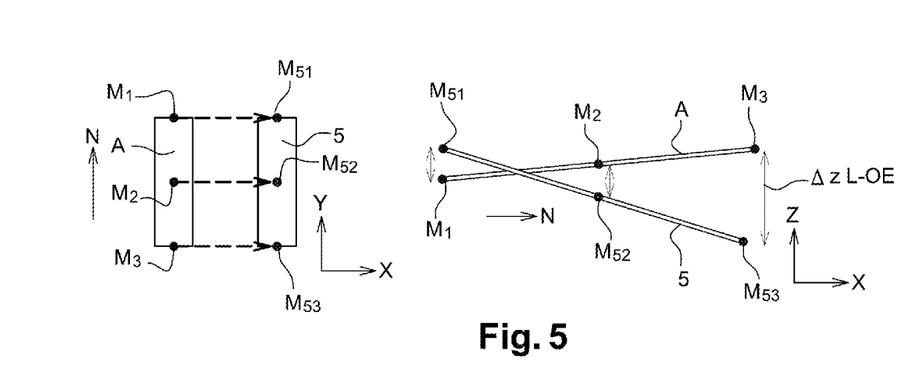
FIGS. 5 to 13 are diagrammatic views illustrating the determination of a set of relative positioning parameters in accordance with the method in accordance with the invention.

The calculation and the hypotheses of the calculation carried out for each reference point of all the tables of the solar power station are as follows:
  the reference point of the table 5 situated to the East is determined on the basis of comparing the abscissa and the ordinate of the points. The notation i denotes the number of the reference point M5$i$, i∈{1, 2, 3};
  to take into account the driving tolerances of the piles P1, P2, P3 and the calculation uncertainties, a circle of 50 cm radius inside which the pile is located is defined;
  the coordinates (X$_{M5i}$, Y$_{M5i}$) of the reference point of the table 5 situated to the East must satisfy the following conditions:

$$|X_{M5i}-X_{M1}-Dew_{th}|<0.5$$

$$|Y_{M5i}-Y_{M1}|<0.5$$

Once the reference point M5i has been identified, the Δz corresponding to the same reference point Mi from the table A concerned is calculated. This result is set out in the following table:

| Table | Reference point | ΔzL-OE |
|---|---|---|
| A | M1 | $Z_{M_1} - Z_{M5_1}$ |
| A | M2 | $Z_{M_2} - Z_{M5_2}$ |
| A | M3 | $Z_{M_3} - Z_{M5_2}$ |

The method 100 in accordance with the invention of evaluating the control parameters then retains only the maximum value of these three values.

The method goes to the next iteration, i.e. the next table, thereby scanning all the tables of all the solar modules 50 of the solar power station 10. No value is entered for the tables situated at the row end to the East because those tables have no direct neighbours 5 to the East.

Regarding now the parameter ΔzL-EO (FIG. 6), the latter reflects a height difference between two tables laid out East-West in the same row; it is taken into account in the control strategy for the solar power station 10 when the Sun is to the East and there is a risk of the table A shading the table 4 to the West. As before, this parameter ΔzL-EO is calculated as a function of the table edge heights. For each of the three reference points M1, M2, M3 of the table A, the reference points M41, M42, M43 of the table 4 to the West are determined in order thereafter to subtract their height.

Figure 6:
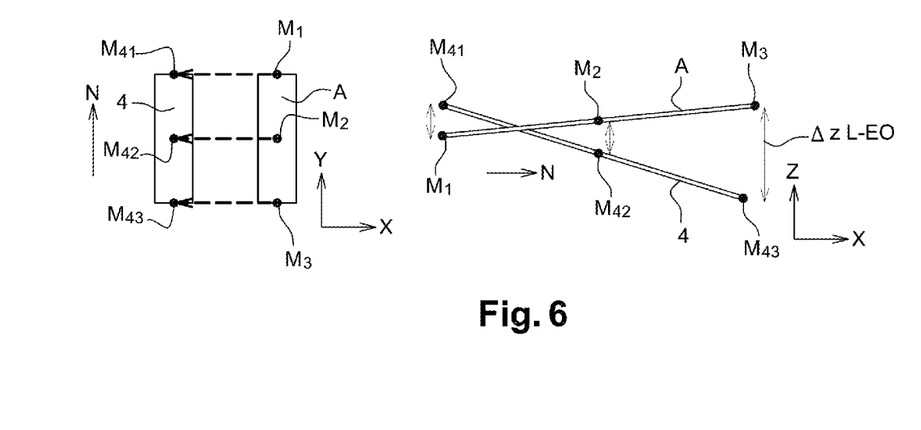

In a similar manner to that for the previous parameter ΔzL-OE, the calculation and the hypotheses of the calculation effected for each reference point of all the tables of the solar power station are as follows:
  the reference point of the table 4 situated to the West is determined on the basis of comparing the abscissa and the ordinate of the points. The notation i denotes the number of the reference point M4$i$, i∈{1, 2, 3};
  to take into account the driving tolerances of the piles P1, P2, P3 and the calculation uncertainties, a circle of 50 cm radius inside which the pile is located is defined;

the coordinates (XM4i, YM4i) of the reference point of the table 4 situated to the East must satisfy the following conditions:

$|X_{M4i}-X_{M1}-Dew_{th}|<0.5$ $|Y_{M4i}-Y_{M1}|<0.5$

Once the reference point M4i has been identified, the Δz corresponding to the same reference point Mi from the table A concerned is calculated. This result is set out in the following table:

| Table | Reference point | ΔzL-EO |
|---|---|---|
| A | M1 | $Z_{M_1} - Z_{M4_1}$ |
| A | M2 | $Z_{M_2} - Z_{M4_2}$ |
| A | M3 | $Z_{M_3} - Z_{M4_3}$ |

Again, the method 100 in accordance with the invention of evaluating the control parameters then retains only the maximum value of these three values.

The method goes to the next iteration, i.e. the next table, thereby scanning all the tables of all the solar modules 50 of the solar power station 10. No value is entered for the tables situated at the row end to the West, because those tables have no direct neighbours 4 to the West.

For the parameter ΔzOEDS (FIG. 7), the latter reflects a height difference between two tables laid out on a North-East diagonal; it is taken into account in the control strategy for the solar power station 10 when the Sun is to the South-West and there is a risk of the table A shading the table 3 to the North-East. As for the previous parameters, this parameter ΔzL-EO is calculated as a function of the table edge heights. For the reference point M1 of the table A, the reference point M33 of the table 3 to the North-East is determined to thereafter subtract their heights. In fact, in this situation, the North edge of the table A extended eastward faces the South edge of the table 3 to the North-East.

Figure 7:
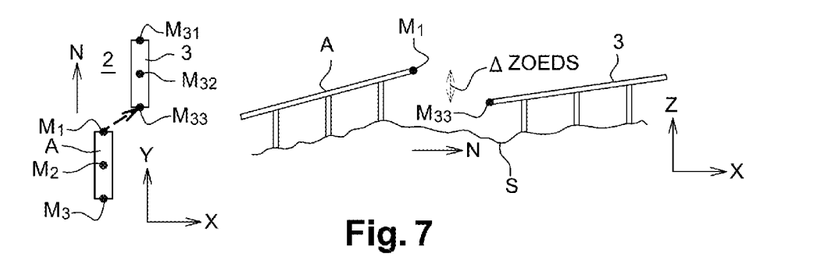

In a similar manner to that for the previous parameters, the calculation and the hypotheses of the calculation effected for the reference point M1 of all the tables of the solar power station are as follows:
- the reference point of the table 3 situated to the North-East is determined on the basis of comparing the abscissa and the ordinate of the points;
- to take into account the driving tolerances of the piles P1, P2, P3 and the calculation uncertainties, a circle of 50 cm radius inside which the pile is located is defined;
- the coordinates $(X_{M33}, Y_{M33})$ of the reference point of the table 3 situated to the North-East must satisfy the following conditions:

$|X_{M33}-X_{M1}-Dew_{th}|<0.5$ $|Y_{M33}-Y_{M1}-Dnsn_{th}|<0.5$

Once the reference point M33 has been identified, the Δz relative to the reference point M1 of the table A concerned is calculated: $\Delta zOEDS=Z_{M1}-Z_{M33}$.

The method goes to the next iteration, i.e. the next table, thereby scanning all the tables of all the solar modules 50 of the solar power station 10. No value is entered for the tables A having no neighbour 3 to the North-East and/or for the reference points M2 and M3.

With regard now to the parameter ΔzEODS (FIG. 8), it reflects a height difference between two tables laid out on a North-West diagonal; it is taken into account in the control strategy for the solar power station 10 when the Sun is to the South-East and there is a risk of the table A shading the table 1 to the North-West. Again, this parameter ΔzEODS is calculated as a function of the table edge heights. For the reference point M1 of each table A, the reference point M13 of the table 1 to the North-West is determined to deduct thereafter their heights. In fact, in this situation, the North edge of the table A extended westward faces the South edge of the table 1 to the North-West.

Figure 8:
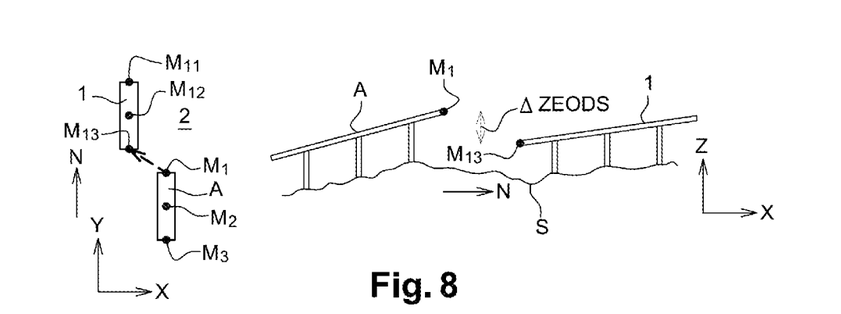

As for the previous parameter, the calculation and the hypotheses of the calculation effected for the reference point M1 of all the tables of the central power station are as follows:
- the reference point of the table 1 situated to the North-West is determined on the basis of comparing the abscissa and the ordinate of the points;
- to take into account the driving tolerances of the piles P1, P2, P3 and the calculation uncertainties, a circle of 50 cm radius inside which the pile is located is defined;
- the coordinates $(X_{M13}, Y_{M13})$ of the reference point of the table 1 situated to the North-West must satisfy the following conditions:

$|X_{M13}-X_{M1}-Dew_{th}|<0.5$ $|Y_{M13}-Y_{M1}-Dnsn_{th}|<0.5$

Once the reference point M13 has been identified, the Δz relative to the reference point M1 of the table A concerned is calculated: $\Delta zEODS=Z_{M1}=Z_{M13}$.

The method goes to the next iteration, i.e. the next table, thereby scanning all the tables of all the solar modules 50 of the solar power station 10. No value is entered for the tables A having no neighbour 1 to the North-West and/or for the reference points M2 and M3.

Figure 9:
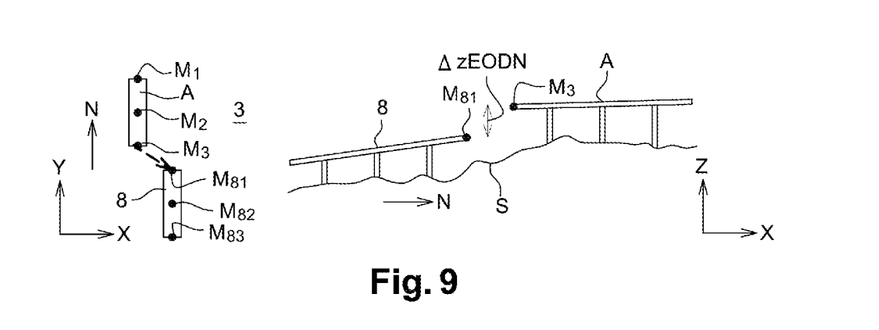

The parameter ΔzOEDN that reflects a height difference between two tables laid out on a South-East diagonal will now be evaluated with reference to FIG. 9; it is taken into account in the control strategy for the power station 10 when the Sun is to the North-West and there is a risk of the table A shading the table 8 to the South-East. Again, this parameter ΔzOEDN is calculated as a function of the table edge heights. For the reference point M3 of each table A, the reference point M81 of the table 8 to the South-East is determined to subtract thereafter their heights. In fact, in this situation, the South edge of the table A extended eastward faces the North edge of the table 8 to the South-East.

As before, the calculation and the hypotheses of the calculation effected for the reference point M1 of all the tables of the solar power station are as follows:
- the reference point of the table 8 situated to the South-East is determined on the basis of comparing the abscissa and the ordinate of the points;
- to take into account the driving tolerances of the piles P1, P2, P3 and the calculation uncertainties, a circle of 50 cm radius inside which the pile is located is defined;
- the coordinates $(X_{M81}, Y_{M81})$ of the reference point of the table 8 situated to the South-East must satisfy the following conditions:

$|X_{M81}-X_{M3}-Dew_{th}|<0.5$ $|Y_{M81}-Y_{M3}-Dnss_{th}|<0.5$

Once the reference point M81 has been identified, the Δz relative to the reference point M3 of the table A concerned is calculated: $\Delta zOEDN=Z_{M8}-Z_{MD1}$.

The method goes to the next iteration, i.e. the next table, thereby scanning all the tables of all the solar modules 50 of the solar power station 10. No value is entered for the tables A having no height 8 to the South-East and/or for the reference points M1 and M2.

Figure 10:
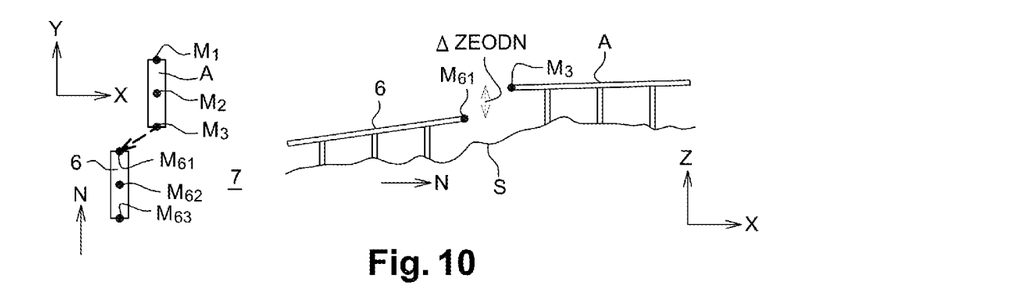

The parameter ΔzEODN that reflects a height difference between two tables laid out on a South-West diagonal will now be evaluated with reference to FIG. 10; it is taken into account in the control strategy for the power station 10 when the Sun is to the North-East and there is a risk of the table A shading the table 6 to the South-West. Again, this parameter ΔzEODN is calculated as a function of the table edge heights. For the reference point M3 of each table A, the reference point M61 of the table 6 to the South-West is determined to subtract thereafter their heights. In fact, in this situation, the South edge of the table A extended westward faces the North edge of the table 6 to the South-West.

As before, the calculation and the hypotheses of the calculation effected for the reference point M1 of all the tables of the solar power station are as follows:
 the reference point of the table 6 situated to the South-West is determined on the basis of comparing the abscissa and the ordinate of the points;
 to take into account the driving tolerances of the piles P1, P2, P3 and the calculation uncertainties, a circle of 50 cm radius inside which the pile is located is defined;
 the coordinates $(X_{M61}, Y_{M61})$ of the reference point of the table 6 situated to the South-West must satisfy the following conditions:

$|X_{M61} - X_{M3} - Dew_{th}| < 0.5$ $|Y_{M61} - Y_{M3} - Dnss_{th}| < 0.5$

Once the reference point M61 has been identified, the Δz relative to the reference point M3 of the table A concerned is calculated: $\Delta zEODN = Z_{M3} - Z_{M61}$.

The method goes to the next iteration, i.e. the next table, thereby scanning all the tables of all the solar modules 50 of the solar power station 10. No value is entered for the tables A having no height 6 to the South-West and/or for the reference points M1 and M2.

It is to be noted that the theoretical values of the distances $Dnsn_{th}$, $Dnss_{th}$ and $Dew_{th}$ obtained from the study 103 have been used for the above calculations. Associated with a tolerance of 0.5 m, the reference points have been located for all the tables A of the solar power station 10 and it has been possible to calculate the height differences Δz for all the tables A of the solar power station 10. It is now necessary to refine these distance values Dnsn, Dnss and Dew. Again, the values for each of the tables A of the solar power station 10 will be calculated.

Figure 11:
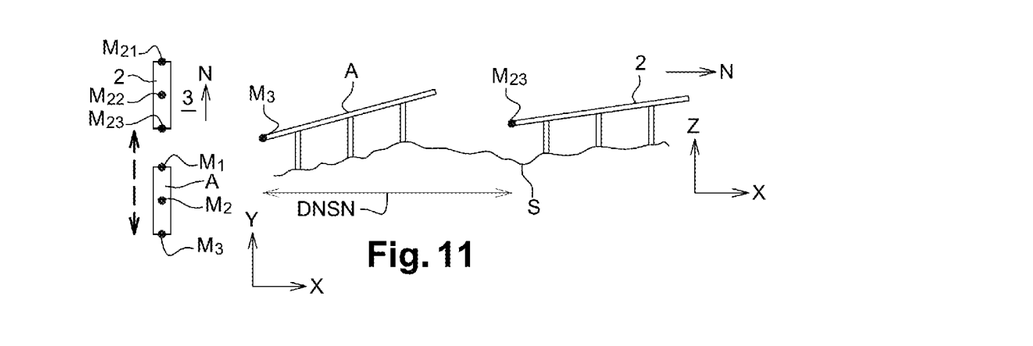

Referring to FIG. 11, the East/West distance DEW corresponds to a difference between the abscissas of the middle reference points M2 of two adjacent tables, here the table A and its directly adjacent neighbour 5 to the East, situated on the same East-West row. As seen above, it is the middle piles P2 that determine the North/South alignment of the tables A. Again, the calculation is effected for all the tables A of the solar power station 10. The parameter DEW is given by the equation: $DEW = M_{M52} - X_{M2}$.

To calculate the parameter DEW it is instead possible to consider the table A and its directly adjacent neighbour to the West, i.e. the table 4.

Figure 12:
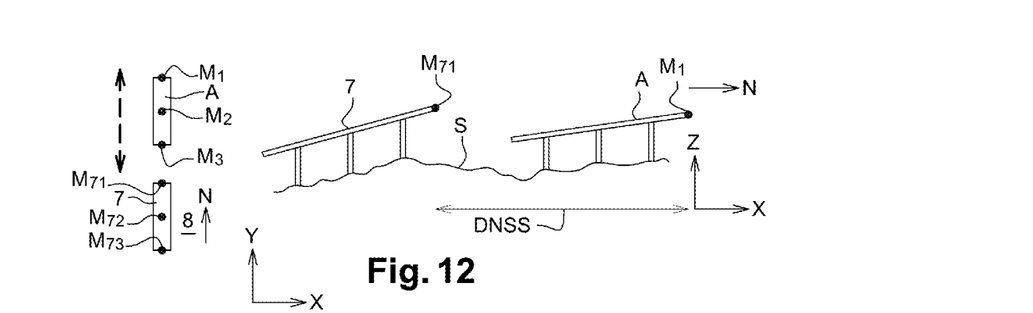

Referring to FIG. 12, the distance DNSN corresponds to the difference between the ordinates of the reference points M3 of two adjacent tables aligned in the North/South direction. It is first necessary to locate the table 2 situated to the North of the table A concerned and then to subtract the ordinates of the points M3. Again this calculation is effected for all the tables A of the solar power station 10. The parameter DNSN is given by the equation: $DNSN = Y_{M33} - Y_{M1}$.

Figure 13:
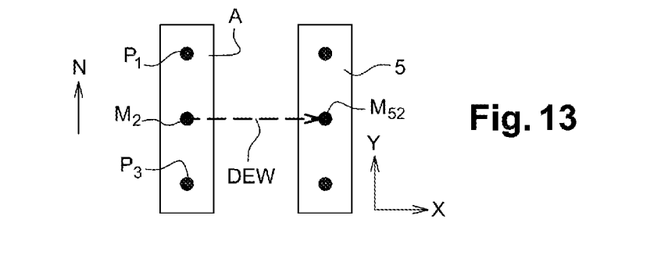

Finally, referring to FIG. 13, the distance DNSS corresponds to the difference between the ordinates of the reference points M1 of two adjacent tables aligned in the North/South direction. It is first necessary to locate the table 7 situated to the South to the table A concerned and then to subtract the ordinates of the points M1. Again, this calculation is effected for all the tables A of the solar power station 10. The parameter DNSS is given by the equation: $DNSS = Y_{M1} - Y_{M71}$.

The set of relative positioning parameters ΔzL-OE, ΔzL-EO, ΔzOEDS, ΔzEODS, ΔzOEDN, ΔzEODN, DEW, DNSN and DNSS is calculated for each of the tables A of all the solar modules 50 of the series of solar trackers 20, 30, 40 of the solar power station 10. Once this step has been effected, the method 100 in accordance with the invention of evaluating the control parameters will determine for each of the solar trackers 20, 30, 40 of the solar power station 10 a set of control parameters specific to the solar tracker 20, 30, 40 concerned from the inclinations and the sets of relative positioning parameters of the tables A of all the solar modules 50 forming the solar tracker 20, 30, 40 concerned.

In the situation shown in the figures the method 100 in accordance with the invention of evaluating the control parameters calculates a mean inclination $\alpha_{mean}$ for each solar tracker 20, 30, 40 of the solar power station 10 from the inclinations α of the tables A of all the solar modules 50 forming the solar tracker 20, 30, 40 concerned. The method 100 in accordance with the invention of evaluating the control parameters then determines a first subset of control parameters $\Delta zL\text{-}OE_{max}$, $\Delta zL\text{-}EO_{max}$, $\Delta zOEDS_{max}$, $\Delta zEODS_{max}$, $\Delta zOEDN_{max}$ and $\Delta zEODN_{max}$ corresponding to the maximum values of the relative positioning parameters ΔzL-OE, ΔzL-EO, ΔzOEDS, ΔzEODS, ΔzOEDN and ΔzEODN, respectively, of all the solar modules 50 forming the solar tracker 20, 30, 40 concerned. The method 100 in accordance with the invention of evaluating the control parameters then determines a second subset of control parameters $DEW_{min}$, $DNSN_{min}$ and $DNSS_{min}$ corresponding to the minimum values of the relative positioning parameters DEW, DNSN and DNSS, respectively, of all the solar modules 50 forming the solar tracker 20, 30, 40 concerned.

Figure 14:
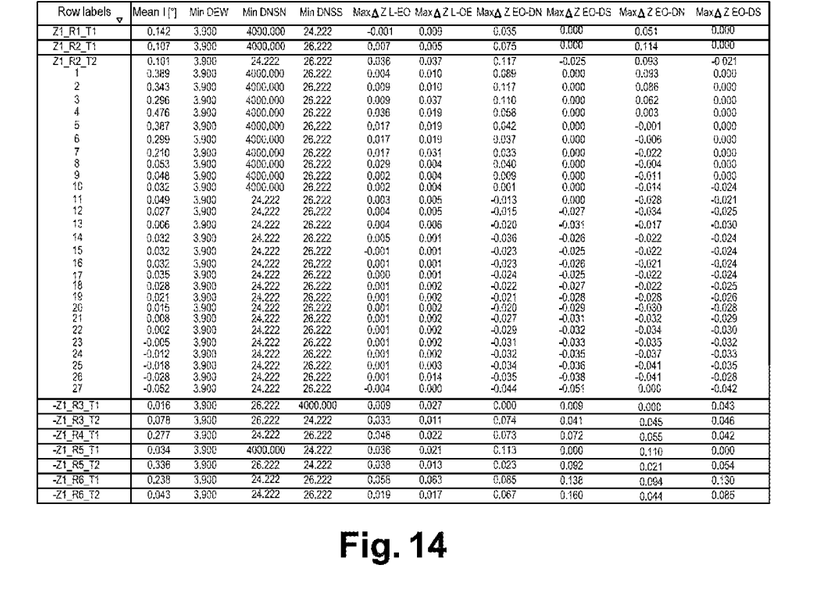
FIG. 14 shows one example of tables obtained using the method in accordance with the invention.

The table in FIG. 14 shows an example of the practical result of the method 100 in accordance with the invention of evaluating the control parameters. The various solar trackers 20, 30, 40 of the solar power station 10 are labelled "Zi_Rj_Tk" in this table. For the solar tracker "Z1_R2_T2", it includes a set of 27 solar modules 50 numbered from 1 to 27 in the table. All the relative positioning parameters of the 27 tables of the solar modules 50 have been set out in the table.

The method 100 in accordance with the invention of evaluating the control parameters makes it possible to customise a set of control parameters for each solar tracker 20, 30, 40 forming the solar power station 10. The control system of the solar power station 10 therefore adapts the control of the only solar tracker or trackers implicated in shading a table of one of their solar modules 50 on one of the directly adjacent tables. This makes it possible to optimise as much as possible the production of energy by the solar power station 10 during the daily passage of the Sun.

Of course, it is possible to apply numerous modifications to the invention without departing from its scope.

The invention claimed is:

1. A method of evaluating control parameters of a series of solar trackers of a solar power station, each solar tracker of the series of solar trackers including a set of solar modules, each solar module including a table (A, 1, 2, 3, 4, 5, 6, 7, 8) of solar radiation processing means mounted to be rotatable about a rotation axis to track a diurnal passage of a Sun on means (P1, P2, P3) of connection to the ground (S), the method comprising:

for each of the ground connection means, determining coordinates in space of a point of connection with the table;

for each of the solar modules:
  (a) determining an inclination ($\alpha$) of the associated table (A) from the coordinates in space so determined of the ground connection means of the associated table;
  (b) determining the coordinates of a series of reference points (M1, M2, M3) of the associated table from the coordinates in space of the ground connection means of the associated table and the inclination of the associated table;
  (c) for each of the solar modules, determining a set of relative positioning parameters of the associated table (A) with tables (1, 2, 3, 4, 5, 6, 7, 8) directly adjacent the associated table of the solar power station from the coordinates in space of the series of reference points of the tables concerned; and
  (d) for each solar tracker of the series of solar trackers, determining the control parameters of the solar tracker concerned from the inclination and the set of relative positioning parameters of the tables of the set of solar modules of the solar tracker concerned.

2. The method according to claim 1, wherein the inclination is evaluated relative to a horizontal.

3. The method according to claim 1, wherein the series of reference points includes a point (M1) on a North edge of the table, a central point (M2) of the table and a point (M3) on a South edge of the table.

4. The method according to claim 3, wherein points M1, M2, and M3 are aligned along a North-South axis.

5. The method according to claim 1, wherein, during step (c), the directly adjacent tables concerned are those for which there is a risk of shading the associated table during the daily passage of the Sun.

6. The method according to claim 1, wherein the set of relative positioning parameters includes height difference values between the North and South edges of the associated table and the facing edges of the directly adjacent tables.

7. The method according to claim 1, wherein the set of relative positioning parameters includes distance values between the associated table and the directly adjacent tables.

8. The method according to claim 6, wherein the control parameters of the solar tracker concerned include maximum values of the distributed height difference values by relative positioning of the associated table and the directly adjacent table concerned.

9. The method according to claim 7, wherein the control parameters of the solar tracker concerned include minimum values of the distributed distance values by relative positioning of the associated table and the directly adjacent table concerned.

10. The method according to claim 1, wherein the control parameters of the solar tracker concerned include an average value of the inclinations of the tables of all the solar modules of the solar tracker concerned.

* * * * *